United States Patent
Connolly et al.

(10) Patent No.: US 8,129,949 B2
(45) Date of Patent: Mar. 6, 2012

(54) DEVICE AND METHOD FOR INSTANTANEOUS LOAD REDUCTION CONFIGURATION TO PREVENT UNDER VOLTAGE CONDITION

(75) Inventors: Sean Connolly, Stony Brook, NY (US); Russell Calvarese, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 849 days.

(21) Appl. No.: 12/179,171

(22) Filed: Jul. 24, 2008

(65) Prior Publication Data

US 2010/0019731 A1   Jan. 28, 2010

(51) Int. Cl.
*H02J 7/00*   (2006.01)

(52) U.S. Cl. ........ 320/134; 320/135; 320/136; 455/572; 455/67.11

(58) Field of Classification Search .......... 320/132, 320/134–136; 455/572, 67.11
See application file for complete search history.

(56) References Cited

U.S. PATENT DOCUMENTS

| | | | |
|---|---|---|---|
| 2001/0055986 A1* | 12/2001 | Odagiri | 455/572 |
| 2005/0164748 A1* | 7/2005 | Kitaji | 455/572 |

* cited by examiner

*Primary Examiner* — Samuel Berhanu

(57) ABSTRACT

A device may include a battery and a plurality of components receiving power from the battery. A voltage of the battery is maintained above a threshold voltage by decreasing a current drawn by one of the components when the battery voltage approaches the threshold voltage.

6 Claims, 3 Drawing Sheets

# DEVICE AND METHOD FOR INSTANTANEOUS LOAD REDUCTION CONFIGURATION TO PREVENT UNDER VOLTAGE CONDITION

BACKGROUND

The operational parameters of handheld devices are often governed by available battery power. While average current demands are often low, peak current demand may be significantly higher. Both average and peak current may factor into the selection of a battery. Once a battery has been selected, care must be taken to insure that the components of the device do not attempt to draw more current than the battery is capable of supporting.

SUMMARY OF THE INVENTION

The present invention relates to a device and a method for instantaneous load reduction configuration to prevent under voltage condition. The device may include a battery and a plurality of components receiving power from the battery. A voltage of the battery is maintained above a threshold voltage by decreasing a current drawn by one of the components when the battery voltage approaches the threshold voltage.

DETAILED DESCRIPTION

Figure 1:
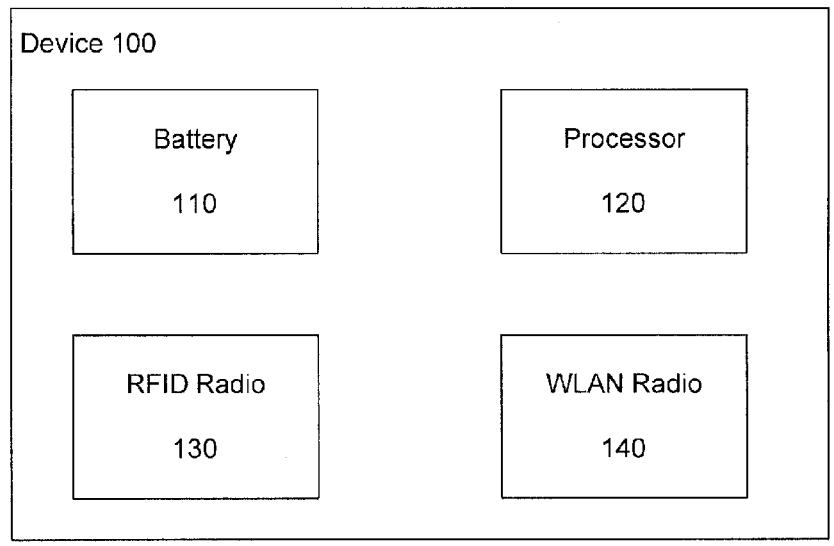
FIG. 1 shows a schematic view of an exemplary mobile computing device according to the present invention.

The exemplary embodiments of the present invention may be further understood with reference to the following description and the appended drawings, wherein like elements are referred to with the same reference numerals. The exemplary embodiments of the present invention describe systems and methods for minimizing the peak current requirements of a mobile computing device that includes more than one current-drawing component.

FIG. 1 shows a schematic layout of an exemplary mobile computing device 100 according to the present invention. The device 100 may include a battery 110, a processor 120, an RFID radio 130 and a WLAN radio 140. Those of skill in the art will understand that the device 100 may typically include other components (e.g., a display, a user input means, a USB interface, a speaker, etc.) that are not shown in FIG. 1 in the interest of clarity. Further, those of skill in the art will understand that the presence of an RFID radio 130 and a WLAN radio 140 is only exemplary, and that the current requirements to be managed by the exemplary embodiments may be due to various other types of components.

The battery 110 may be any type of battery capable of storing electric energy for use by the components of the device 100, including the processor 120, the RFID radio 130 and the WLAN radio 140. The battery 110 may be reusable or disposable. In one exemplary embodiment, the battery 110 is a lithium ion rechargeable battery. The processor 120 may be any processing unit known in the art and suitable for operating a mobile computing device such as the device 100. The RFID radio 130 may be coupled with the processor 120 and an antenna (not shown) to enable RFID communication with other devices, and the WLAN radio 140 may similarly be coupled with the processor 120 and a further antenna (not shown) to enable WLAN communication with other devices. Each of the RFID radio 130 and the WLAN radio 140 may coordinate communications using any of various communications protocols known in the art.

Figure 2:
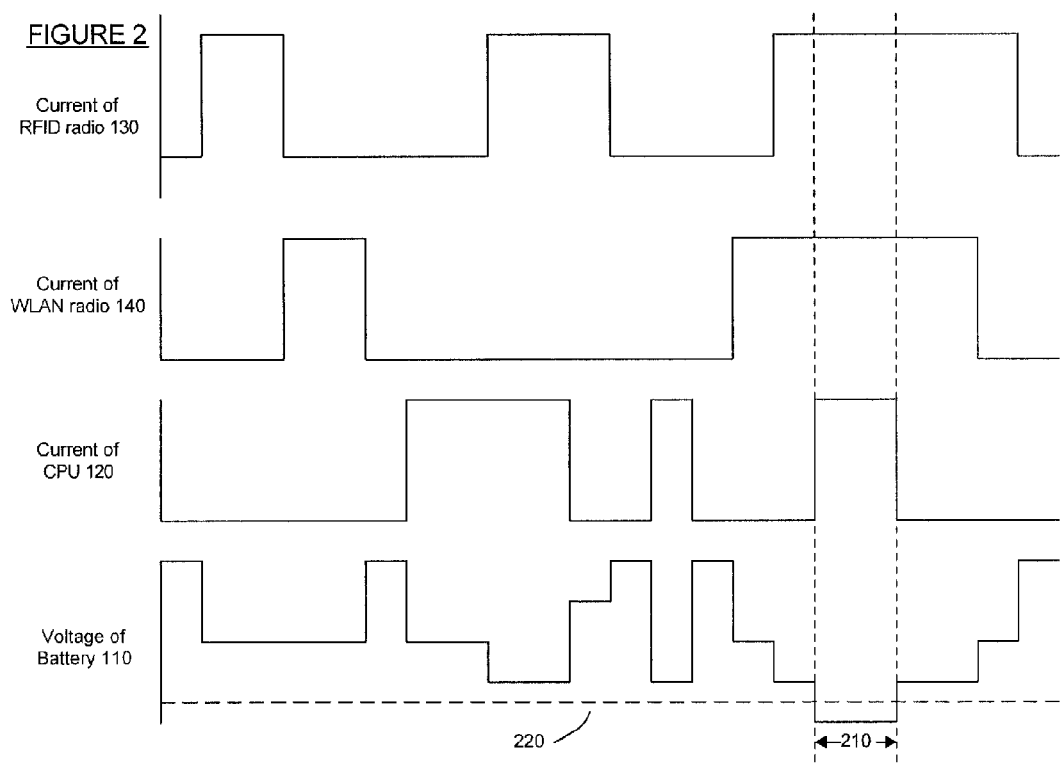
FIG. 2 shows a graph of current usage against time for an exemplary device according to the present invention.

FIG. 2 illustrates an exemplary graph showing the power consumption of the processor 120, the on-off status of the RFID radio 130 and the WLAN radio 140, and the voltage of the battery 110 with respect to time. It should be noted that the processor power consumption and the component on-off status are only exemplary and have been selected to illustrate the problem to be addressed by the exemplary embodiments. Those of skill in the art will understand that battery voltage as shown in FIG. 2 may depend on factors including the internal impedance of the battery 110, the temperature of the environment in which the device 100 is being used (e.g., the voltage of the battery 110 may be lower when the ambient temperature is low), and the current demands of the processor 120, the RFID radio 130 and the WLAN radio 140 as illustrated.

FIG. 2 illustrates that when multiple components are demanding high levels of current simultaneously, the voltage of the battery 110 may drop below a critical threshold level. When this happens, the device 100 may shut down due to under voltage. For example, in time interval 210, the processor 120, the RFID radio 130 and the WLAN radio 140 are all drawing high amounts of current. As a result, the voltage of the battery 110 may drop below a threshold level 220, and the device 100 may shut down. Those of skill in the art will understand that FIG. 2 is only intended to indicate qualitatively the effect that the current demands of the various components may have on the voltage of the battery 110, and that no precise quantitative current or voltage measurements are indicated.

Figure 3:
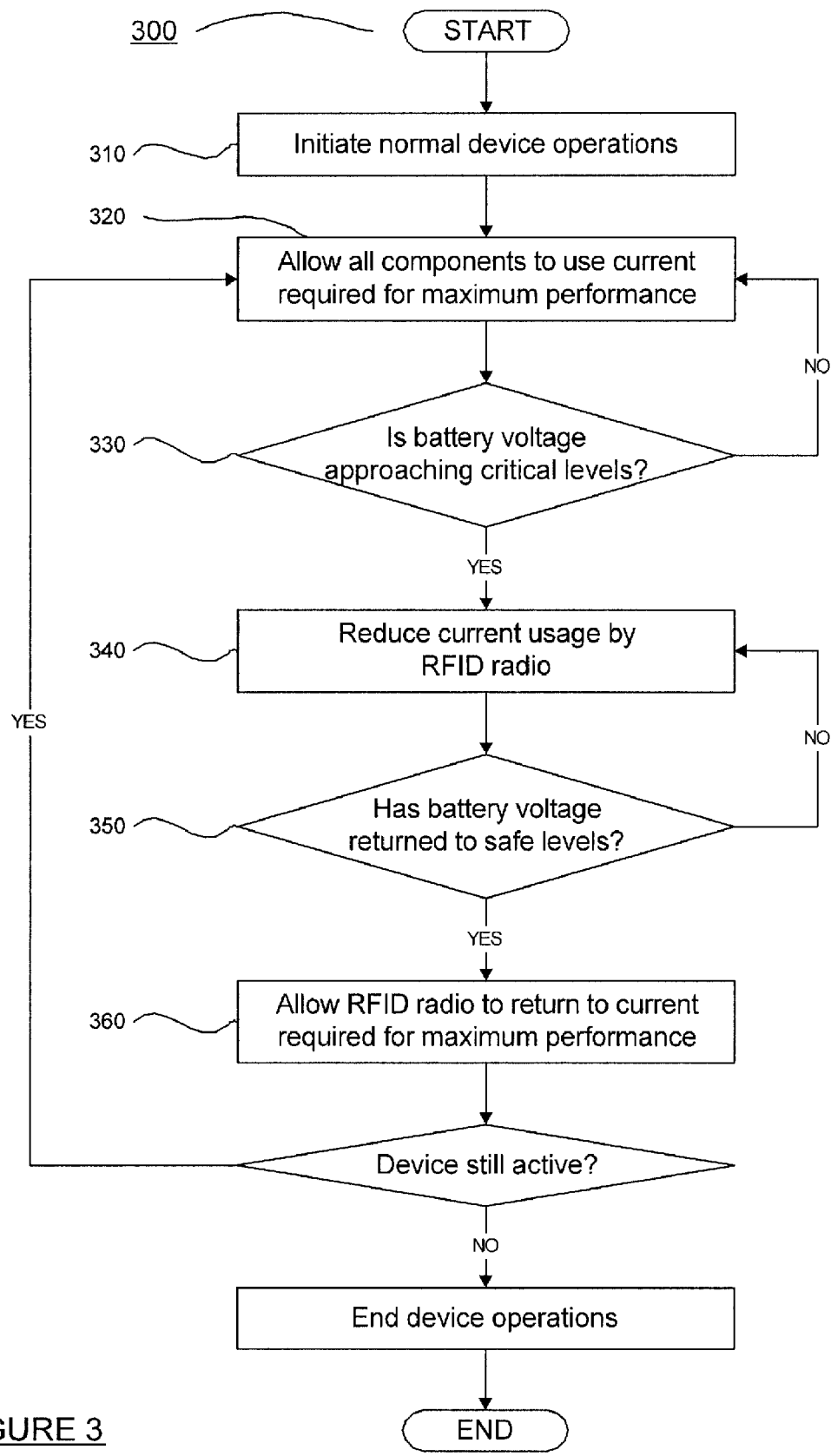
FIG. 3 shows an exemplary method according to the present invention.

FIG. 3 illustrates an exemplary method 300 for maintaining the peak current demands of a mobile device (e.g., the device 100 of FIG. 1) below a threshold. The method 300 is described herein specifically with reference to the components of the exemplary device 100; however, those of skill in the art will understand that the same principles may apply to various other types of battery-powered devices. In step 310, the operations of the device 100 are initiated. This step may include powering on the processor 120, initiating an operating system, powering on the RFID radio 130 and the WLAN radio 140, etc. In step 320, the components of the device 100 (the RFID radio 130, the WLAN radio 140, etc.) are placed into a state where they are permitted to use current supplied by the battery 100 as they see fit. This initiates a normal state of operations wherein all components may perform at maximum levels unless they are subsequently instructed otherwise. Operations that occur during this state of operations may involve any function or functions appropriate to the nature of the device 100, the software executed by the processor 120, the operation of the RFID radio 130 and the WLAN radio 140, the operation of other components of the device 100 not shown in FIG. 1, etc.

In step 330, it is determined whether the voltage of the battery 110 is at a critical level. The critical level may be predetermined, and in one exemplary embodiment may be an amount that is sufficiently greater than a shutdown threshold of the battery 110 (as described above with reference to FIG. 2) to provide sufficient time for power demands to be reduced before the battery 110 reaches the shutdown threshold. Battery voltage may be monitored in any of the various manners known in the art, such as by measuring voltage across a resistor, using a software application to monitor voltage, etc. In one embodiment, the voltage of the battery 110 is monitored using the exemplary bias controller 400 illustrated in FIG. 4. The bias controller 400 will be described in greater detail below.

If the voltage of the battery 110 is not determined to be at a critical level, the method returns to step 320, where normal operations of the device 100 may continue. Those of skill in the art will understand that the determination of step 330 may be made continuously during operation in the unrestricted manner described above with reference to step 320. Alternately, if step 330 determines that the voltage of the battery 110 is at a critical level, then the current draw of the RFID radio 130 is reduced by an amount which will prevent the voltage of the battery 110 from decreasing further and placing the device 100 in danger of an unwanted shutdown. The reduction in current of the RFID radio 130 may be accomplished in various manners. If the voltage of the battery 110 is being monitored by a software application, the reduction may be accomplished by an instruction sent to the RFID radio 130. In an embodiment including the bias controller 400 of FIG. 4, the power output to the RFID radio 130 is reduced as the battery voltage input approaches the threshold voltage. As previously stated, the bias controller 400 will be described in greater detail below.

Continuing with the method 300, once the current draw of the RFID radio 130 has been reduced in step 340, the voltage of the battery 110 is monitored in step 350 to determine whether it has returned to safe levels. Monitoring may be accomplished, for example, by the same means described above with reference to step 330. Until the voltage returns to a safe level, the method returns to step 340, where the RFID radio 130 is kept in its low current operational state. Those of skill in the art will understand that the monitoring process of step 350, like that of step 330, is continuously ongoing while the RFID radio 130 is operating in the low current state. Once it is determined that the voltage of the battery 110 has returned to a safe level, the device 110 returns to its normal state of operations (e.g., the state described above with reference to step 320) in step 360. Subsequently, in step 370, if the device 100 remains active then the method returns to step 320, with the monitoring of step 330 returning to the ongoing state described above. If not, the operations of the device 100 are halted in step 380 (e.g., the RFID radio 130 and the WLAN radio 140 are powered down, applications being executed by the processor 120 are terminated, the operating system is shut down, the processor 120 is powered down, etc.), and the method terminates.

Figure 4:
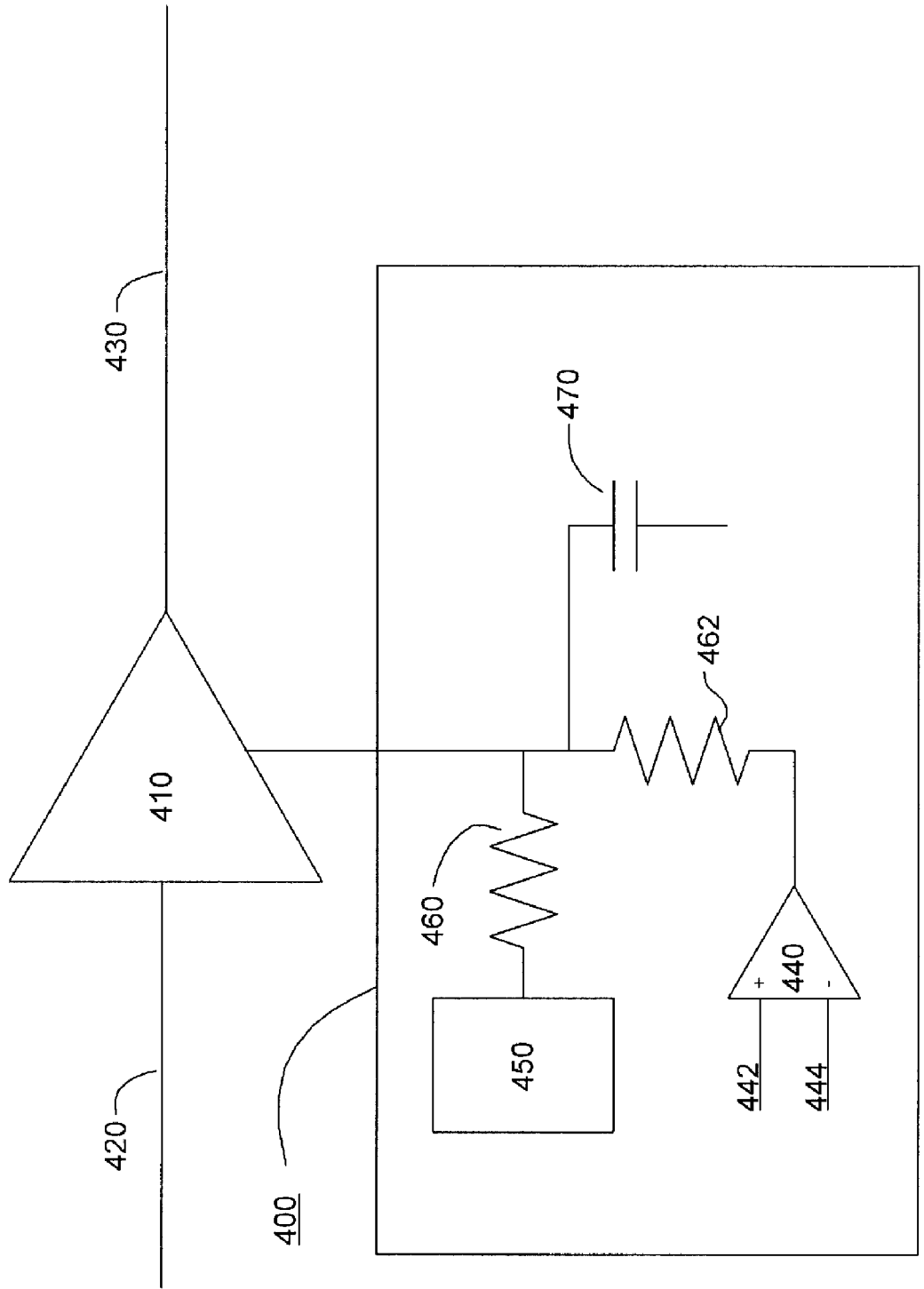
FIG. 4 shows a circuit diagram of a mechanism for monitoring and controlling the current demands of a component of an exemplary mobile device according to the present invention.

FIG. 4 shows an exemplary power amplifier for an RFID system with bias controller 400 that may be used to monitor battery voltage and reduce power consumption of the RFID power amplifier 410 in response to a reduced battery voltage. FIG. 4 further illustrates an RFID power amplifier 410 that receives an RF signal input 420 from the RFID radio (e.g., the RFID radio 130) and provides an amplified signal to an RFID antenna via power output path 430. The bias controller 400 includes an open collector comparator 440 with a battery voltage input 442 (e.g., a measurement of the voltage of the battery 110) and a threshold voltage input 444. The threshold voltage input 444 may be set to any voltage at which the power consumption of the RFID radio 130 should be reduced to prevent the voltage of the battery 110 from being further reduced. The threshold voltage input 444 may be generated by any number of components. For example, the processor 120 may be programmed to output the threshold voltage input 444. As described above, the battery voltage may be measured in any known manner to produce the battery voltage input 442.

The bias controller 400 further includes a power amplifier bias control 450 (e.g., a digital analog converter). The bias controller 400 further includes resistors 460 and 462 and a capacitor 470. The capacitor 470 may be, for example, a 1-μF capacitor. The resistance of the resistor 460 is preferably significantly higher than the resistance of the resistor 462 (e.g., 100 ohms and 1 ohm), in order to provide a fast ramp down in the power output 430 when the battery voltage input 442 approaches the threshold input voltage 444. A fast ramp down is desirable in order to rapidly reduce current drawn by the RFID radio 130 so that the voltage of the battery 110 does not drop below a critical level and shut down the device 100.

It should also be noted that while the exemplary embodiments reduced power to the RFID radio 130, it is also possible that power may be reduced to other components of the device 100 in addition to, or in the alternative to, the RFID radio 130.

By the application of the exemplary embodiments, mobile computing devices with batteries of limited capacity are able to operate in a default mode that allows their various components to use the power required for maximum performance. Such devices are then able to self-monitor and self-correct to prevent shutdown or other undesired conditions when their components are combining to draw an excessive amount of power.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A wireless communication device, comprising:
   a battery;
   a Radio Frequency Identification (RFID) transceiver, a Wireless Local Area Network (WLAN) transceiver, and a processor receiving power from the battery; and
   a bias controller operable to control power consumption of a power amplifier of the RFID transceiver, the bias controller including a bias control, a comparator for comparing the battery voltage input and a threshold voltage input, and a resistor divider connected with a shunt capacitor, a first resistor of the resistor divider disposed between the bias control and the power amplifier of the RFID transceiver and a second resistor of the resistor divider connected between the comparator and the power amplifier of the RFID transceiver,
   wherein the voltage of the battery is maintained above the threshold voltage by decreasing a current drawn from the battery by placing the RFID transceiver in a low current state by reducing the power consumption of the power amplifier of the RFID transceiver by the bias controller when the battery voltage approaches the threshold voltage, and if the battery voltage can not be maintained above the threshold voltage shutting down the RFID transceiver, the WLAN transceiver, and the processor.

2. The device of claim 1, wherein the threshold voltage is a predetermined safety margin applied to a shutdown voltage.

3. The device of claim 1, wherein the first resistor has a resistance value that is not less than one-hundred times the resistance value of the second resistor.

4. A method, comprising:
   monitoring a voltage of a battery of a wireless communication device, the battery supplying power to a Radio Frequency Identification (RFID) transceiver, a Wireless Local Area Network (WLAN) transceiver, and a processor;

placing the RFID transceiver in a low current state by reducing the power consumption of a power amplifier of the RFID transceiver when the battery voltage decreases below a predetermined threshold voltage, wherein placing is accomplished by a bias controller operable to control power to the power amplifier of the RFID transceiver, the bias controller including a bias control, a comparator for comparing the battery voltage input and the predetermined threshold voltage input, and a resistor divider connected with a shunt capacitor, a first resistor of the resistor divider disposed between the bias control and the power amplifier and a second resistor of the resistor divider connected between the comparator and the power amplifier of the RFID transceiver; and shutting down the RFID transceiver, the WLAN transceiver, and the processor if the battery voltage can not be maintained above the predetermined threshold voltage.

5. The method of claim 4, wherein the predetermined threshold voltage is a predetermined safety margin applied to a shutdown voltage threshold.

6. The method of claim 4, wherein the first resistor has a resistance value that is not less than one-hundred times the resistance value of the second resistor.

\* \* \* \* \*

UNITED STATES PATENT AND TRADEMARK OFFICE
CERTIFICATE OF CORRECTION

PATENT NO. : 8,129,949 B2  
APPLICATION NO. : 12/179171  
DATED : March 6, 2012  
INVENTOR(S) : Connolly et al.

Page 1 of 1

It is certified that error appears in the above-identified patent and that said Letters Patent is hereby corrected as shown below:

On the title page, in the Figure, delete " 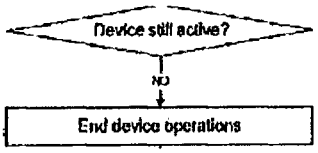 " and insert -- 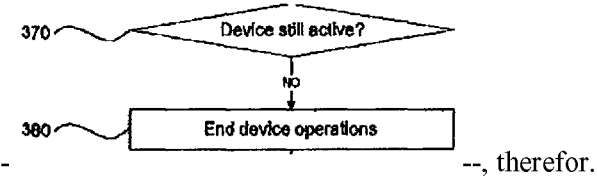 --, therefor.

In Fig. 3, Sheet 2 of 3, delete " 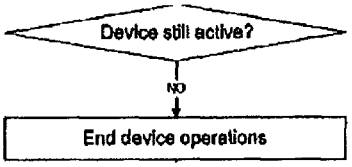 " and insert -- 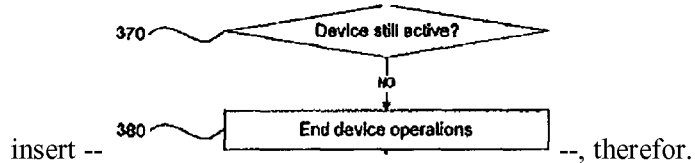 --, therefor.

Signed and Sealed this  
Fifteenth Day of January, 2013

David J. Kappos  
*Director of the United States Patent and Trademark Office*